(12) United States Patent
Benedetti et al.

(10) Patent No.: US 7,186,051 B2
(45) Date of Patent: Mar. 6, 2007

(54) METAL/PLASTIC INSERT MOLDED SILL PLATE FASTENER

(75) Inventors: Steven M Benedetti, Sterling Heights, MI (US); Rosalind A Nessel, Birmingham, MI (US)

(73) Assignee: Newfrey LLC, Newark, DE (US)

( * ) Notice: Subject to any disclaimer, the term of this patent is extended or adjusted under 35 U.S.C. 154(b) by 106 days.

(21) Appl. No.: 10/829,103

(22) Filed: Apr. 21, 2004

(65) Prior Publication Data

US 2004/0223805 A1 Nov. 11, 2004

Related U.S. Application Data

(60) Provisional application No. 60/469,438, filed on May 9, 2003.

(51) Int. Cl.
*B25G 3/36* (2006.01)
*E04G 7/00* (2006.01)
*F16B 5/02* (2006.01)

(52) U.S. Cl. .................. 403/388; 403/397; 403/329

(58) Field of Classification Search ............... 403/388, 403/397, 329; 411/913, 908, 508–510, 903; 24/297, 453, 702
See application file for complete search history.

(56) References Cited

U.S. PATENT DOCUMENTS

| | | | |
|---|---|---|---|
| 2,815,554 A | 12/1957 | Pieper | |
| 3,018,529 A | 1/1962 | Perrochat | |
| 3,029,486 A | 4/1962 | Raymond | |
| 3,183,030 A | 5/1965 | Schleuter | |
| 3,703,747 A | 11/1972 | Hamman | |
| 3,810,279 A | 5/1974 | Swick et al. | |
| 3,988,808 A | 11/1976 | Poe et al. | |
| 4,176,428 A | 12/1979 | Kimura | |
| 4,261,243 A | 4/1981 | Palmer | |
| 4,363,160 A * | 12/1982 | Wibrow | 24/297 |
| 4,505,611 A | 3/1985 | Nagashima et al. | |

(Continued)

FOREIGN PATENT DOCUMENTS

EP 1 059 461 12/2000

(Continued)

OTHER PUBLICATIONS

European Search Report, Sep. 14, 2004, 3 pgs.

Primary Examiner—Daniel P. Stodola
Assistant Examiner—Nahid Amiri
(74) Attorney, Agent, or Firm—Harness, Dickey & Pierce, P.L.C.

(57) ABSTRACT

A fastener for joining trim pieces to a motor vehicle includes a metal insert molded into an elastomeric body of a fastener. An anti-rotational rib prevents excessive rotation of the fastener after installation. Oppositely extending flexible wings of the metal insert are spaced from each other to allow full deflection upon insert of the fastener without interference between the flexible wings. Protective guards formed at distal ends of a pair of support legs provide improved insertion alignment for the fastener as well as protection between the fastener and metal surfaces of the vehicle. In another embodiment of the present invention, a dog house assembly is provided having aperture and slots mating with the installation features of the sill plate fastener. In still another embodiment, a method for installing a sill plate molding into a vehicle using a fastener of the present invention is provided.

6 Claims, 6 Drawing Sheets

U.S. PATENT DOCUMENTS

| | | |
|---|---|---|
| 4,517,711 A | 5/1985 | Tanaka |
| D293,883 S | 1/1988 | Hirohata |
| 4,716,633 A | 1/1988 | Rizo |
| 4,750,878 A | 6/1988 | Nix et al. |
| 4,810,147 A | 3/1989 | Hirohata |
| 4,861,208 A | 8/1989 | Boundy |
| 4,867,599 A | 9/1989 | Sasajima |
| 4,874,276 A | 10/1989 | Iguchi |
| 4,927,287 A * | 5/1990 | Ohkawa et al. .......... 403/408.1 |
| 4,932,105 A | 6/1990 | Muller |
| 5,168,604 A | 12/1992 | Boville |
| 5,195,793 A | 3/1993 | Maki |
| 5,339,491 A | 8/1994 | Sims |
| 5,448,809 A | 9/1995 | Kraus |
| 5,494,392 A | 2/1996 | Vogel et al. |
| 5,507,610 A | 4/1996 | Benedetti et al. |
| 5,531,499 A | 7/1996 | Vecchio et al. |
| 5,542,158 A | 8/1996 | Gronau et al. |
| 5,592,719 A | 1/1997 | Eto et al. |
| 5,704,753 A * | 1/1998 | Ueno ......................... 411/509 |
| 5,850,676 A | 12/1998 | Takahashi et al. |
| 6,049,952 A | 4/2000 | Mihelich et al. |
| 6,253,423 B1 | 7/2001 | Friedrich et al. |
| 6,322,126 B1 | 11/2001 | Kraus |
| 6,371,550 B2 | 4/2002 | Iwatsuki et al. |
| 6,438,804 B1 | 8/2002 | Romero Magariño |
| 6,453,522 B1 | 9/2002 | Romero Magariño et al. |
| 6,474,921 B1 | 11/2002 | Gordon |
| 6,514,023 B2 * | 2/2003 | Moerke ....................... 411/45 |
| 6,644,902 B1 | 11/2003 | Cutshall |
| 6,648,542 B2 * | 11/2003 | Smith et al. ................. 403/291 |
| 6,669,274 B2 | 12/2003 | Barnard et al. |
| 6,715,185 B2 | 4/2004 | Angellotti |
| 2002/0043041 A1 | 4/2002 | Yoyasu |
| 2003/0000048 A1 | 1/2003 | Boville |
| 2003/0159256 A1 | 8/2003 | Clarke |
| 2004/0047705 A1 | 3/2004 | Cutshall |
| 2004/0240932 A1 * | 12/2004 | Benedetti |
| 2005/0034282 A1 * | 2/2005 | Kurily et al. |

FOREIGN PATENT DOCUMENTS

| | | |
|---|---|---|
| FR | 84 950 | 5/1965 |
| FR | 2 748 300 | 11/1997 |
| GB | 1 065 914 | 4/1967 |
| GB | 2 316 707 A | 3/1998 |
| JP | 11125224 A | 5/1999 |
| WO | WO 9911154 A1 | 3/1999 |

* cited by examiner

METAL/PLASTIC INSERT MOLDED SILL PLATE FASTENER

FIELD OF THE INVENTION

The present invention relates generally to fasteners and more specifically to a fastener design for joining trim pieces to the interior surfaces of automobiles.

BACKGROUND OF THE INVENTION

For automotive applications, fasteners are used to join trim pieces to sections or metal body portions of the automobile. The requirements for these fasteners are that they be insertable into apertures of the automobile and meet requirements to both retain the insert as well as provide a minimum pullout retention force such that the insert can be removed without damaging the insert. Common fastener designs include directly opposed flexible wings which deflect inwardly upon insertion of the fastener and expand by spring force to hold the fastener within a rectangular slot in the automobile. A drawback of commonly used fasteners is the inability of the fastener to compensate for misalignment between the fastener location and the aperture in the automobile. A further drawback is the inability of commonly used fasteners to accommodate slight rotation of the assembled joint in order to compensate for further misalignment between the fastener and the aperture of the automobile.

Another drawback of some existing designs for fasteners is the all metal body of the fastener itself. An all-metal fastener can result in corrosion between the metal contact surfaces between the fastener and the automobile as well as causing damage to the area of the aperture of the automobile upon insertion of the fastener or removal of the fastener.

SUMMARY OF THE INVENTION

According to a preferred embodiment of the present invention, an apparatus is provided for adjoining accessories to panels on the interior of vehicles. The apparatus includes a molded fastener body which further includes a head, a neck joined to the head, a flexible skirt joined to the neck, an anti-rotation feature joined to both the neck and skirt, and a pair of support legs perpendicularly from an underside of the skirt. A metal insert is positioned between the pair of support legs and molded at the same time as the molded fastener is formed such that the metal insert is non-removably joined to the molded fastener portion. The metal insert includes a pair of support legs which surround a pair of flexible wings. Each of the flexible wings extends toward an opposite face of the metal insert such that the flexible wings deflect inwardly upon insertion of the apparatus and return by spring force to retain the apparatus in the installed position with the vehicle.

The anti-rotation feature is provided in the form of a generally V-shaped neck which mates with a similarly formed slot in an upper surface of a dog-house formed in the accessory joined to the vehicle. The anti-rotation feature permits a small degree of rotation of the apparatus to allow for fit-up but precludes further rotation. Each of the flexible wings also optionally includes an additional raised portion for improving the retention capability of each of the flexible wings. The support legs also provide at distal ends a protective guard feature such that the elastomeric material of the molded fastener body contacts the vehicle surface first to prevent potential damage between the fastener and the vehicle. Each of the protective guards also includes a tapered end feature to help align the fastener upon assembly.

In another embodiment of the present invention, a dog-house design is provided in the accessory having an aperture and a lead-in slot configured to align with the neck and anti-rotation feature of the fastener. In a further embodiment of the present invention, a method for joining a seal plate molding to a seal plate of a vehicle is provided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
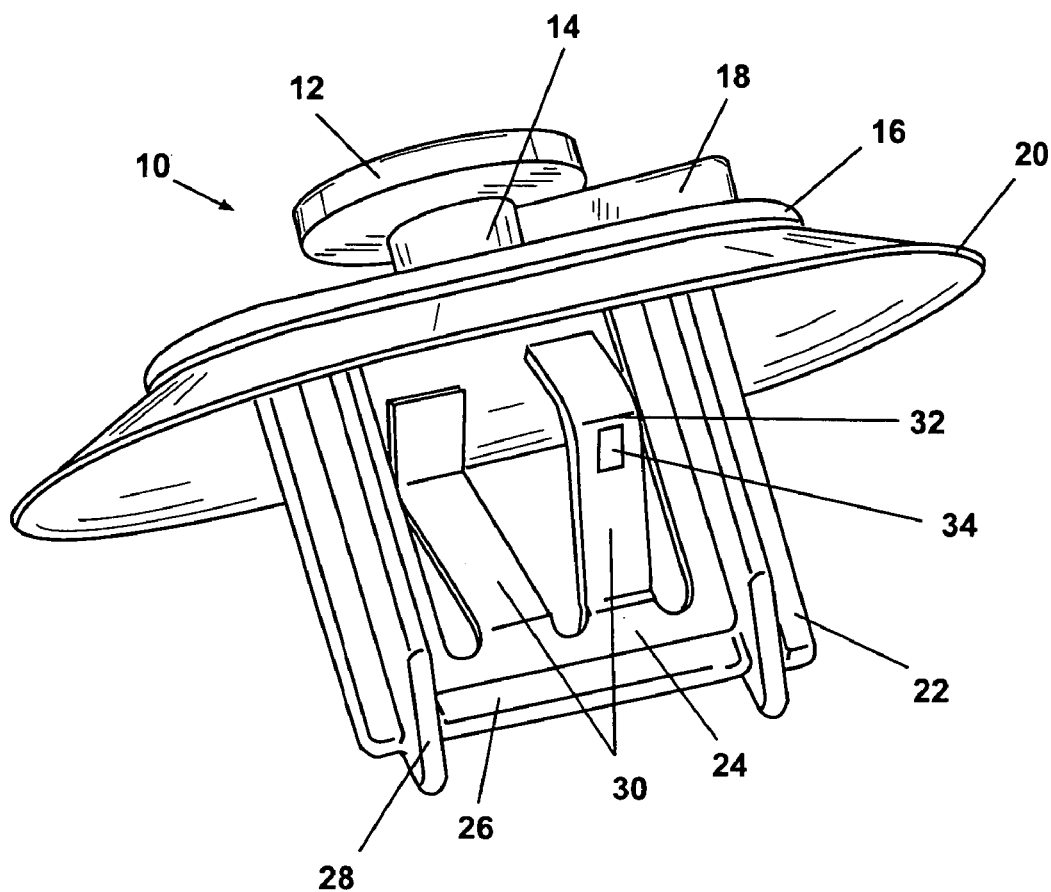
FIG. 1 is a perspective view of a fastener of the present invention.

The following description of the preferred embodiment(s) is merely exemplary in nature and is in no way intended to limit the invention, its application, or uses.

According to the preferred embodiment of the present invention, a fastener 10 includes a circular head 12 molded to a neck region 14. The neck region is co-molded to a top surface 16. An anti-rotation rib 18 which is formed in a general V-shaped configuration having its apex joined to neck region 14 is co-molded between neck region 14 and top surface 16. A flexible skirt 20 having a generally oval shape is co-molded to top surface 16 and extends generally downward and at an angle away from top surface 16. The top surface 16 is a generally planar portion of fastener 10 and also forms one of the surfaces for joining fastener 10 to a dog-house assembly which will be described in further detail in reference to FIGS. 3 and 4.

A pair of angled support legs 22 extend perpendicularly from an undersurface of the flexible skirt 20. Each of the angled support legs 22 support opposed outer perimeter edges of a metal insert 24. A cross member 26 is connectably molded between distal ends of each of the support legs 22. Cross member 26 also provides support for a lower edge of metal insert 24. Each of the support legs 22 at the distal ends is provided with a guard portion 28 having tapered ends such that the tapered ends angle toward the distal ends of each of the support legs 22.

Metal insert 24 includes a pair of deflection wings 30 which are formed at a lower edge of metal insert 24. Each of the deflection wings 30 includes a bend at a lower portion thereof and each extends in an opposite direction from the other such that each deflection wing 30 is positioned towards an opposite face of metal insert 24, which is formed as a generally planar surface. Deflection wings 30 are each spaced from one another at the base portion such that deflection wings 30 can deflect towards each other, but do not oppose each other directly. This permits full deflection of deflection wings 30 without interfering with each other during the deflection portion of travel. Each deflection wing 30 also includes an upper bend 32 having an inwardly tapering section formed thereafter. Optionally, an engagement rib 34 is formed adjacent to each bend portion 32 to provide additional retention capability for deflection wings 30.

Figure 2:
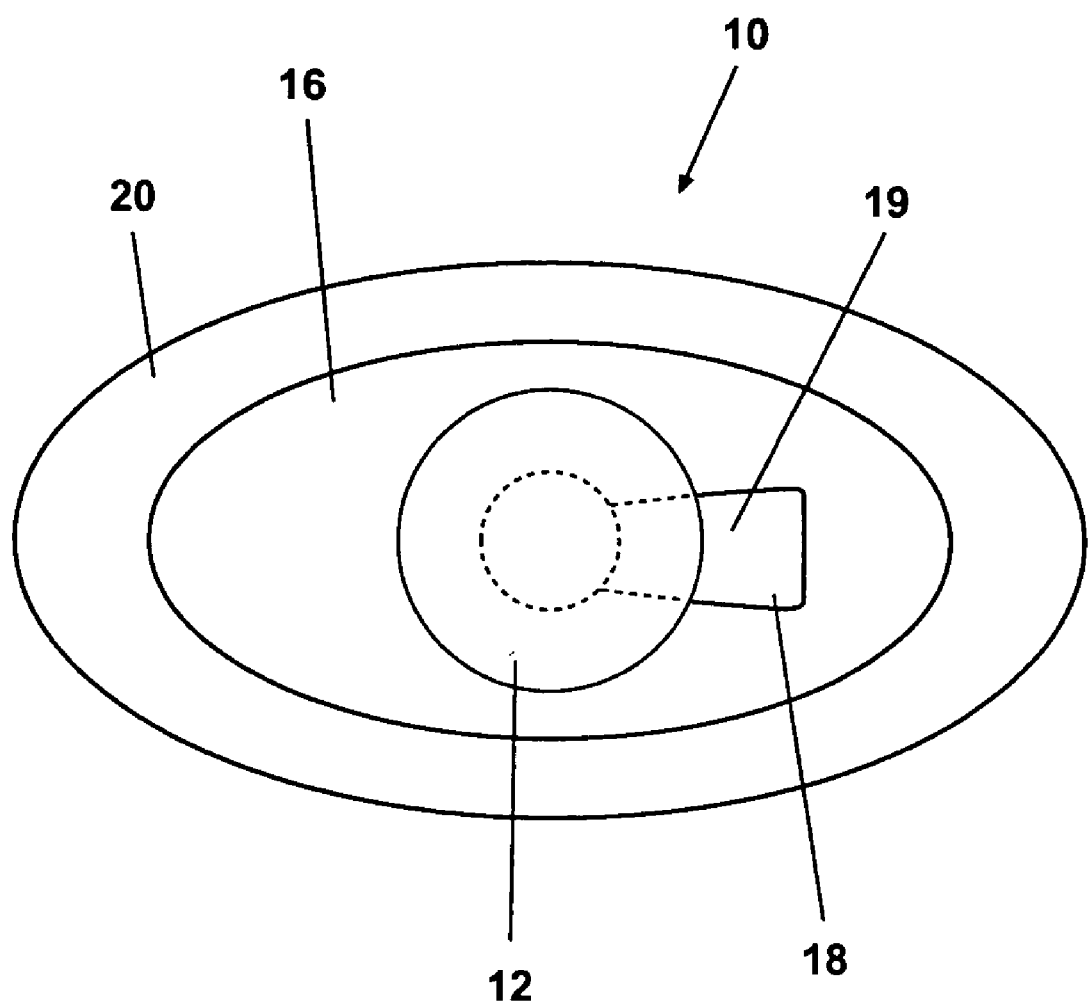
FIG. 2 is a plan view of the fastener of the present invention.

Referring next to FIG. 2, the generally oval shape of flexible skirt 20 is seen. The generally V-shaped configuration of anti-rotational rib 18 is also visible in this view having a body 19 extending outwardly from an outer diameter of neck region 14. Circular head 12 is generally centrally positioned on the top surface 16.

Figure 3:
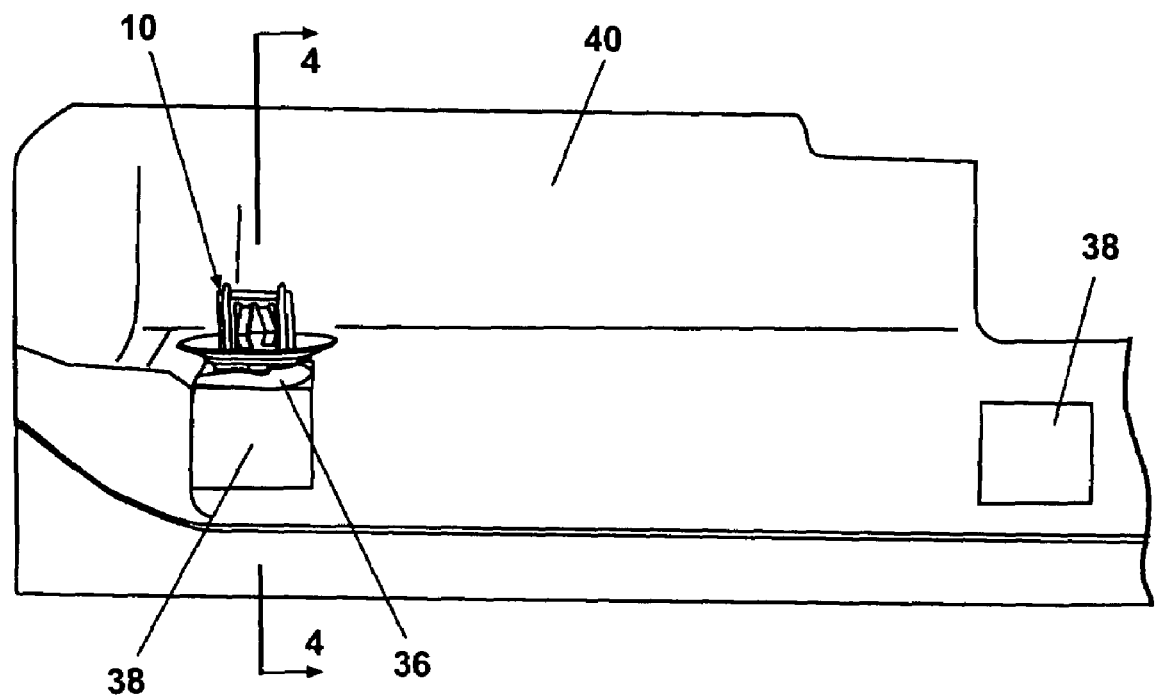
FIG. 3 is a perspective view of a fastener of the present invention joined to a dog-house assembly co-molded to a trim plate molding the present invention.
Figure 4:
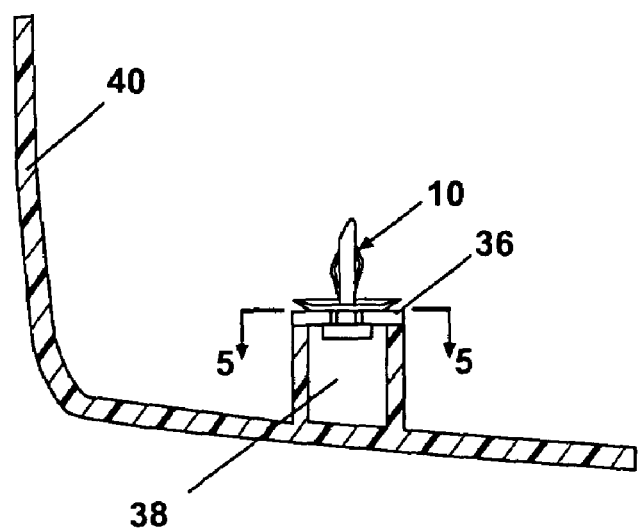
FIG. 4 is an end elevational view taken at Section 4—4 of FIG. 3.

Referring next to FIGS. 3 through 6, a mating face 36 of a dog-house assembly 38 is shown. The dog-house assembly 38 is co-molded with a trim plate molding 40. An exemplary installation of fastener 10 onto mating face 36 is shown in FIG. 3. When installed as shown, and referring back to FIG. 1, circular head 12 fits below mating face 36 while top surface 16 fits above and in contact with mating face 36. In this position, each of the support legs 22 is directed upward as well as the flexible skirt 20. From this sub-assembly position, support legs 22 and deflection wings 30 are insertable into a generally rectangular shaped aperture (further described in reference to FIG. 6), of a vehicle trim plate, such that guard portions 28 first contact a rectangular shaped aperture 50 and provide a lead-in feature for support legs 22. Deflection wings 30 deflect inwardly upon contact with side walls 52 of the generally rectangular shaped aperture 50 as fastener 10 is further inserted. Insertion of fastener 10 is complete when bend portions 32 extend entirely through the rectangular shaped aperture 50 allowing deflection wings 30 to deflect by spring force to retain the fastener 10 in position. At this time, flexible skirt 20 engages a generally flat surface 48 surrounding the rectangular shaped aperture of the vehicle to provide a moisture and soil seal to prevent moisture and soil from contacting metal insert 24 and the general area surrounding the rectangular shaped aperture of the vehicle.

Figure 5:
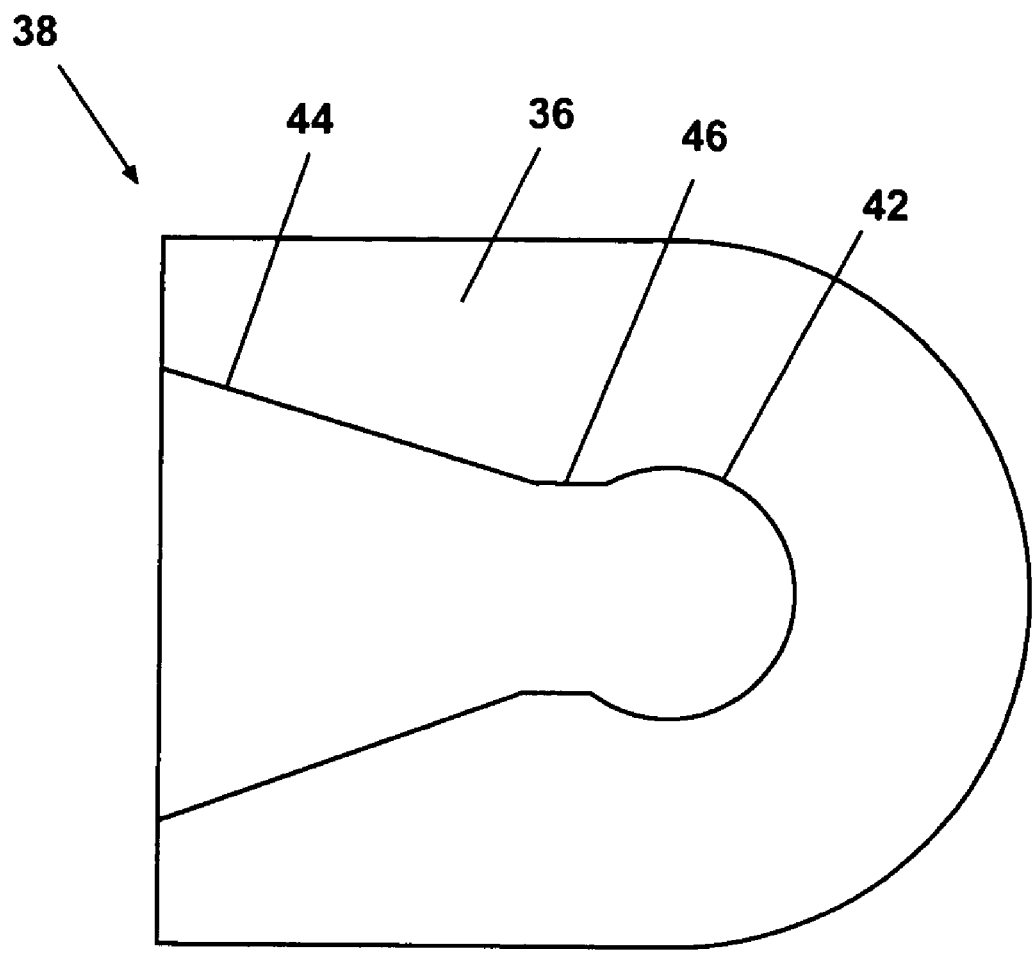
FIG. 5 is a plan view of the dog-house assembly of FIG. 3.
Figure 6:
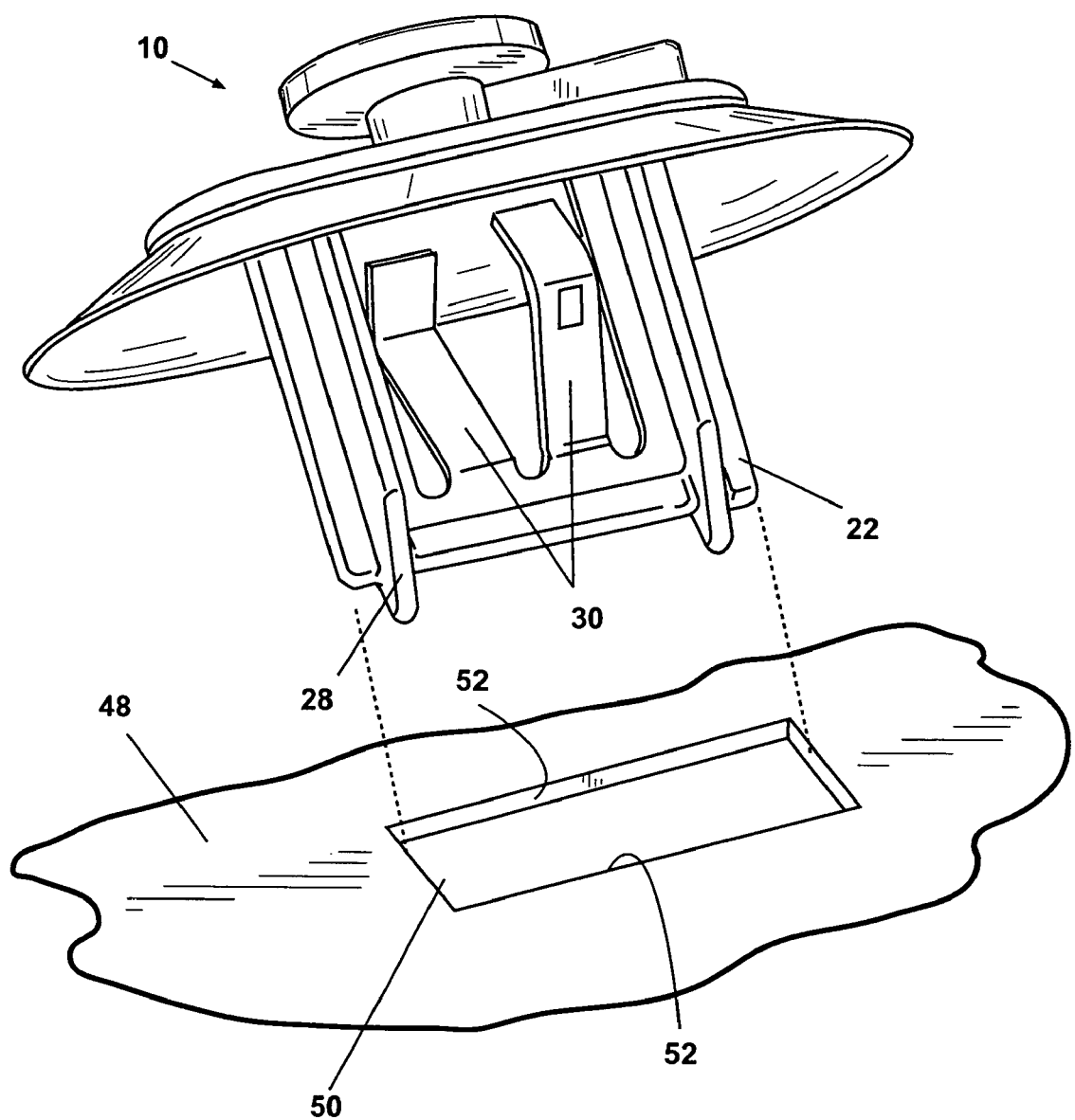
FIG. 6 is a perspective view of a fastener of the present invention showing prior engagement with a rectangular shaped aperture of a vehicle.

Referring specifically to FIG. 5, the mating face 36 of dog house assembly 38 (shown in Figure) is provided with a generally circular aperture 42 sized to permit entry of neck region 14. V-shaped slot 44 is configured to enclose anti-rotational rib 18 while allowing a certain degree of deflection (approximately 7 degrees of deflection). A throat region 46 is sized slightly smaller than a diameter of aperture 42 to provide a positive retention feature for neck region 14 after neck region 14 is pressed into aperture 42.

Figure 7:
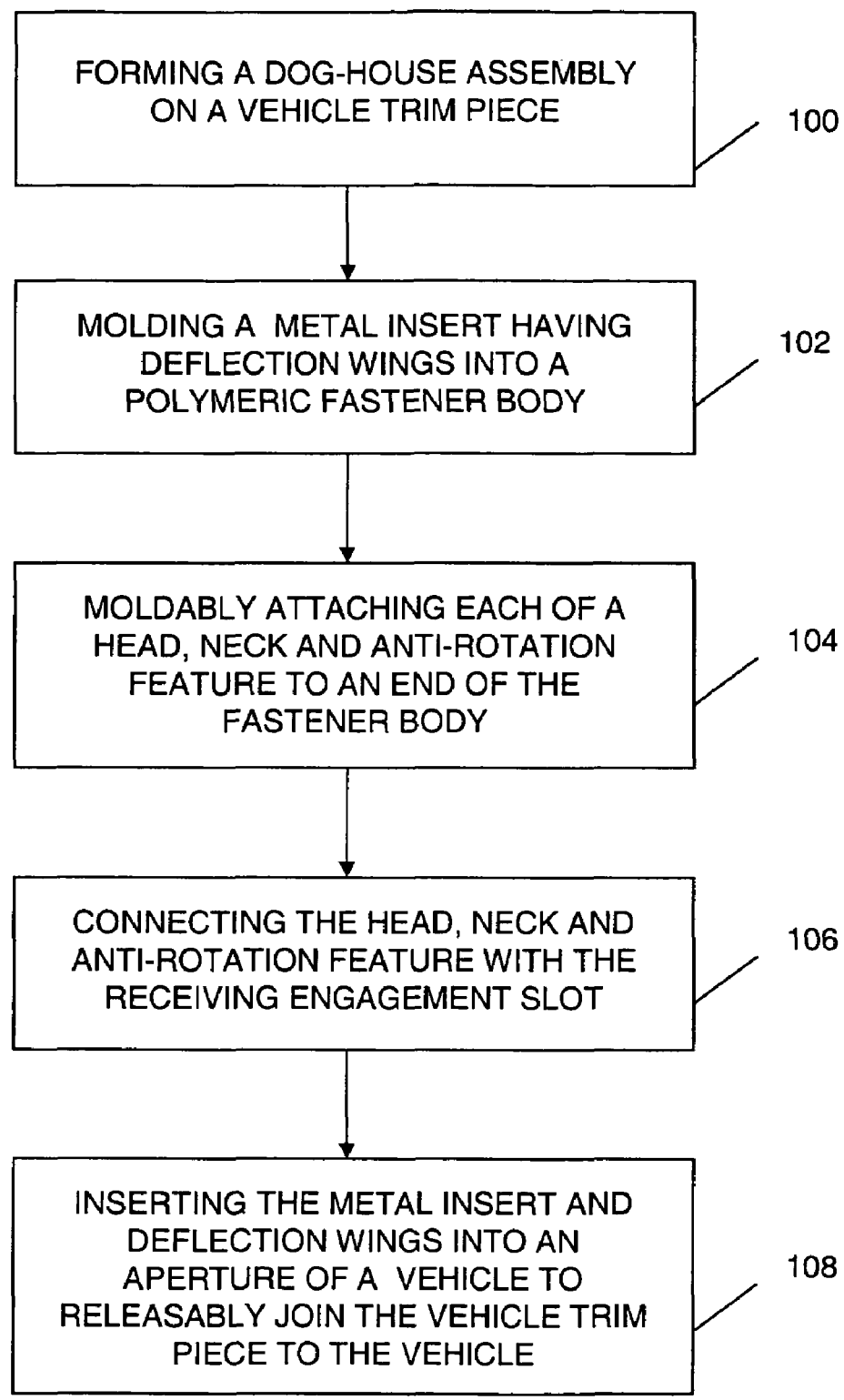
FIG. 7 is a flow diagram of the steps to apply a fastener of the present invention.

Referring to FIG. 7, the steps to apply a fastener of the present invention to join a trim piece molding to a vehicle include a step 100, forming a dog-house assembly on a vehicle trim piece. In step 102, a metal insert having deflection wings is molded into a polymeric fastener body. At step 104, each of a head, neck and anti-rotation feature are moldably attached to an end of the fastener body. At step 106, the head, neck and anti-rotation features are connected with a receiving engagement slot. At final step 108, the metal insert and deflection wings are inserted into an aperture of a vehicle to releasably join the vehicle trim piece to the vehicle.

A molded sill plate fastener of the present invention provides several advantages. The anti-rotational rib of the present invention allows fastener assembly onto a dog-house permitting both a small degree of rotation and a positive rotation stop. This permits some angular misalignment between the fastener and an aperture of the motor vehicle. By molding a metal insert into a generally elastomeric body of the present invention, a one-piece fastener is formed having the spring force capability of metal deflection wings within an elastomeric body to protect the automobile surfaces when the fastener is installed. The flexible skirt of the present invention provides a moisture and dirt seal to minimize moisture and dirt entrance into the area of the metal insert and rectangular shaped aperture of the automobile. Protective guards/lead-in features of the present invention help prevent damage to the vehicle upon installation of the fastener as well as provide a more positive alignment means for the fastener during assembly. Optional use of engagement ribs formed adjacent to the bend portions of the deflection wings also provides additional retention capability for the deflection wings. Finally, by spacing each of the deflection wings laterally apart from each other and initially extending them towards opposite sides of the metal insert and towards opposite sides of the support legs, the deflection wings are free to fully deflect inwardly without contacting each other thus providing greater retention capability of the fasteners.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for joining an accessory to an interior panel of a vehicle, said system comprising:
    a molded fastener body including:
        a head;
        a neck joined to the head;
        a flexible skirt joined to the neck;
        an anti-rotation feature joined to both the neck and the skirt; and
        a pair of support legs extending perpendicularly from an underside of the skirt; and
    an insert positioned between the pair of support legs including:
        a generally planar body having opposed sides; and
        a pair of spaced flexible wings each formed to extend away from one of the opposed sides;
    wherein said anti-rotation feature is generally formed in a "V" shape having an apex joined to the neck and a body portion extending distally therefrom.

2. The system of claim 1, wherein said molded fastener body comprises an elastomeric material.

3. The system of claim 1, wherein said insert comprises a metallic material.

4. A system for joining an accessory to an interior panel of a vehicle, said system comprising:
    a molded fastener body including:
        a head;
        a neck joined to the head;
        a flexible skirt joined to the neck;

an anti-rotation feature joined to both the neck and the skirt; and a pair of support legs extending perpendicularly from an underside of the skirt;

an insert positioned between the pair of support legs including:

a generally planar body having opposed sides; and a pair of spaced flexible wings each formed to extend away from one of the opposed sides; and a generally planar portion located between the neck and the skirt, having the neck and the anti-rotation feature supported from an upper surface thereof and the skirt extending at an angle therefrom.

5. The system of claim 1, comprising a protective guard tapering lead-in formed at a distal end of each of the support legs.

6. The system of claim 1, comprising a cross member joining distal ends of the support legs and partially supporting the metal insert adjacent connecting points between the flexible wings and the metal insert.

* * * * *